(12) United States Patent
Kang et al.

(10) Patent No.: US 10,408,948 B2
(45) Date of Patent: Sep. 10, 2019

(54) RADIATION DETECTOR AND METHOD FOR MANUFACTURING SAME

(71) Applicants: Changgoo Kang, Gwangju (KR); Jangho Ha, Jeonju-si (KR); Joonho Oh, Jeongeup-si (KR); Hansoo Kim, Jeonju-si (KR); Youngsoo Kim, Daejeon (KR); Manhee Jeong, Incheon (KR)

(72) Inventors: Changgoo Kang, Gwangju (KR); Jangho Ha, Jeonju-si (KR); Joonho Oh, Jeongeup-si (KR); Hansoo Kim, Jeonju-si (KR); Youngsoo Kim, Daejeon (KR); Manhee Jeong, Incheon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/739,873

(22) PCT Filed: Mar. 2, 2016

(86) PCT No.: PCT/KR2016/002082
§ 371 (c)(1),
(2) Date: Dec. 26, 2017

(87) PCT Pub. No.: WO2017/007108
PCT Pub. Date: Jan. 12, 2017

(65) Prior Publication Data
US 2018/0196147 A1    Jul. 12, 2018

(30) Foreign Application Priority Data
Jul. 7, 2015    (KR) .................. 10-2015-0096508

(51) Int. Cl.
*G01T 1/20*    (2006.01)
*G01T 1/202*    (2006.01)

(52) U.S. Cl.
CPC .............. *G01T 1/2006* (2013.01); *G01T 1/20* (2013.01); *G01T 1/2002* (2013.01); *G01T 1/2023* (2013.01)

(58) Field of Classification Search
CPC .... G01T 1/2002; G01T 1/2006; G01T 1/2023
See application file for complete search history.

(56) References Cited

U.S. PATENT DOCUMENTS

| | | |
|---|---|---|
| 7,375,341 B1 | 5/2008 | Nagarkar et al. |
| 2011/0042650 A1 | 2/2011 | Avouris et al. |
| 2012/0001761 A1 | 1/2012 | Voutilainen et al. |

FOREIGN PATENT DOCUMENTS

| | | |
|---|---|---|
| JP | 2013502735 A | 1/2013 |
| JP | 2013258274 A | 12/2013 |

(Continued)

OTHER PUBLICATIONS

International Search Report dated Jun. 16, 2016 issued in PCT/KR2016/002082.

*Primary Examiner* — Mark R Gaworecki
(74) *Attorney, Agent, or Firm* — Scully Scott Murphy and Presser

(57) ABSTRACT

The present invention provides a radiation detector comprising: a scintillator for absorbing radiation to generate light; and a light detector formed in the scintillator, wherein the scintillator is composed of a two-dimensional nanomaterial for imparting ductility. The scintillator is formed by laminating the two-dimensional nanomaterial, the two-dimensional nanomaterial being at least one of graphene oxide, reduced graphene oxide, and graphene quantum dots.

13 Claims, 14 Drawing Sheets

(56) References Cited

FOREIGN PATENT DOCUMENTS

| KR | 101099139 B1 | 12/2011 |
|----|--------------|---------|
| KR | 1020130132105 A | 12/2013 |
| KR | 1020140037702 A | 3/2014 |
| KR | 1020140067257 A | 6/2014 |

(a)

(b)

(c)

(d)

RADIATION DETECTOR AND METHOD FOR MANUFACTURING SAME

CROSS-REFERENCE TO RELATED APPLICATIONS

This application is the National Stage filing under 35 U.S.C. 371 of International Application No. PCT/KR2016/002082, filed on Mar. 2, 2016, which claims the benefit of earlier filing date and right of priority to Korean Application No. 10-2015-0096508, filed on Jul. 7, 2015, the contents of which are all hereby incorporated by reference herein in their entirety.

TECHNICAL FIELD

The present invention relates to a radiation detector and a method for manufacturing the same.

BACKGROUND ART

A radiation detector for measuring radiation has various types, and a scintillator type radiation detector has a structure that a scintillator for generating light when radiation is incident thereon is coupled to a light detector for detecting the generated light.

The scintillator is based on comparatively expensive crystalline compounds such as $LaBr_3$, LYSO, $Gd_2SiO_5$ (GSO), $Bi_4Ge_3O_{12}$(BGO), NaI, CsI, TlBr and $HgI_2$. However, the scintillator has disadvantages that the compounds are voluminous and stable, and it is difficult to implement a large area. Further, it takes a lot of time to grow a single crystal when manufacturing the radiation detector, and growing conditions are complicated, resulting in high fabrication costs.

Generally, a light detector is manufactured based on a semiconductor wafer having a great thickness and a hard characteristic, such as silicon (Si) or germanium (Ge).

The conventional radiation detector where a scintillator and a light detector are coupled to each other is not flexible, and has a difficulty in operation in a bent or folded state. As a result, it is difficult to apply the conventional radiation detector to a wearable or foldable device. Further, it is difficult to apply the radiation detector to a large place for a missile search or a container search using radiation. Further, there is a disadvantage that the radiation detector has its thickness increased after being manufactured.

DISCLOSURE OF THE INVENTION

Therefore, an object of the present invention is to provide a radiation detector having a flexibility and a smaller thickness than the conventional one by forming a scintillator and a light detector in a different manner from the conventional manner, and having a large area.

Another object of the present invention is to provide a method for manufacturing a radiation detector.

To achieve these and other advantages and in accordance with the purpose of the present invention, as embodied and broadly described herein, there is provided a radiation detector, comprising: a scintillator for absorbing radiation to generate light; and a light detector formed in the scintillator, wherein the scintillator is formed of a two-dimensional nanomaterial for providing ductility.

In an embodiment of the present invention, the scintillator is formed by laminating the two-dimensional nanomaterial which is at least one of a graphene oxide, a reduced graphene oxide, and graphene quantum dots.

In another embodiment of the present invention, the two-dimensional nanomaterial has a chemical formula of $MX_2$, the 'M' is one of elements which belong to groups 4~6 in a periodic table, and the 'X' is one of S, Se and Te.

In an embodiment of the present invention, the light detector includes: a first contact electrode and a second contact electrode disposed on positions spaced apart from each other; and an activation layer for connecting the first contact electrode and the second contact electrode with each other, and for forming an electron-hole pair by absorbing light, wherein the activation layer is formed of a two-dimensional nanomaterial for providing ductility, so as to be coupled to the scintillator in a corresponding shape.

The two-dimensional nanomaterial includes at least one of graphene, a graphene oxide, a reduced graphene oxide, and graphene quantum dots.

The two-dimensional nanomaterial has a chemical formula of $MX_2$, the 'M' is one of elements which belong to groups 4~6 in a periodic table, and the 'X' is one of S, Se and Te.

In another embodiment of the present invention, the light detector includes a passivation layer adhered to the activation layer, supported by the contact electrodes, and configured to restrict exposure of the activation layer to outside.

In an embodiment of the present invention, the radiation detector further comprises an insulating layer interposed between the scintillator and the light detector, and configured to prevent an electric signal between the scintillator and the light detector.

To achieve these and other advantages and in accordance with the purpose of the present invention, as embodied and broadly described herein, there is also provided a method for manufacturing a radiation detector, the method comprising: manufacturing a scintillator; and forming a light detector on the scintillator, wherein the manufacturing a scintillator includes: manufacturing a polymer solution including a two-dimensional nanomaterial except for graphene; applying the polymer solution onto a substrate through a printing process; forming the scintillator by removing moisture of the polymer solution; and forming an insulating layer on the scintillator.

In another embodiment of the present invention, the forming a light detector on the scintillator includes: forming a two-dimensional nanomaterial on the scintillator as a material of an activation layer; forming contact electrodes on a surface of the activation layer; and interposing the activation layer between the contact electrodes by patterning the activation layer.

In another embodiment of the present invention, there is provided a method for manufacturing a radiation detector, the method comprising: forming a scintillator by using a two-dimensional nanomaterial except for graphene; forming a light detector including the two-dimensional nanomaterial on a silicon oxide substrate; forming a device transfer temporary substrate on the light detector, and immersing the silicon oxide substrate in an $SiO_2$ etching solution for removal; and attaching the device transfer temporary substrate which supports the light detector, onto a surface of the scintillator.

In another embodiment of the present invention, the forming a light detector on a silicon oxide substrate includes: forming an activation layer by transferring a two-dimensional nanomaterial onto a silicon oxide substrate; forming two contact electrodes spaced apart from each other on a surface of the activation layer; and interposing the activation layer between the contact electrodes by patterning the activation layer.

In another embodiment of the present invention, the method further comprises: dehydrating the device transfer temporary substrate to remove the device transfer temporary substrate attached onto the surface of the scintillator; and immersing the device transfer temporary substrate in an acetone solution for a chemical reaction.

Advantageous Effects

In the present invention, the scintillator may be formed of a two-dimensional nanomaterial including a graphene oxide, a reduced graphene oxide, and graphene quantum dots, and the light detector may be formed by using a two-dimensional nanomaterial including graphene. Accordingly, the radiation detector may have flexibility and a small thickness due to a characteristic of its material.

Further, in the present invention, the radiation detector of a large area may be manufactured through a printing process, without using expensive semiconductor equipment through a process of directly forming a light detector on a surface of a scintillator. This may reduce a fabrication cost and a fabrication time.

MODES FOR CARRYING OUT THE PREFERRED EMBODIMENTS

Hereinafter, embodiments of the present invention will be explained in more detail with reference to the attached drawings.

For the sake of brief description with reference to the drawings, the same or equivalent components will be provided with the same reference numbers, and description thereof will not be repeated. A singular expression in the specification includes a plural meaning unless it is contextually definitely represented.

Figure 1:
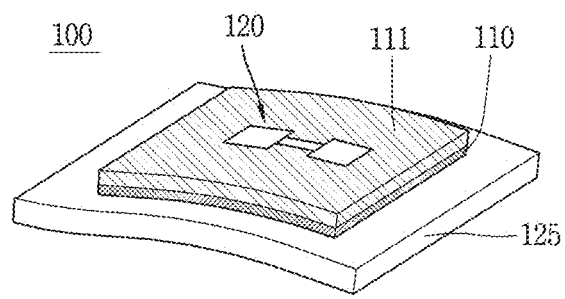
FIG. 1 is a conceptual view showing that a radiation detector is coupled to a substrate.
Figure 2:
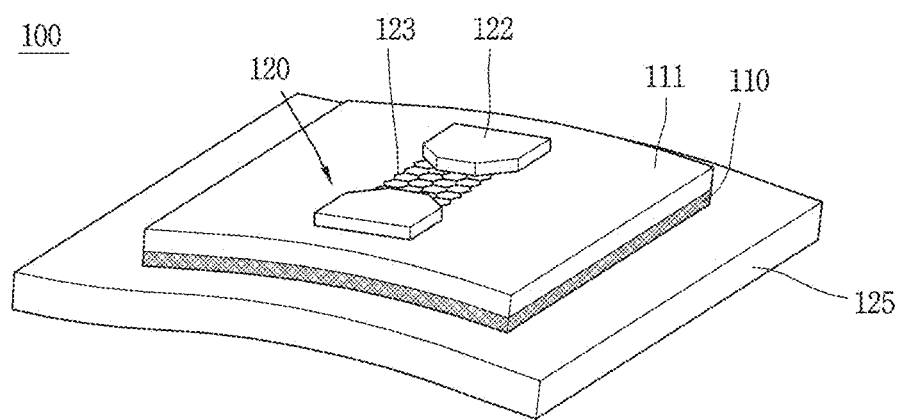
FIG. 2 is a perspective view showing a structure that a radiation detector is coupled onto a substrate.

FIGS. 1 and 2 show a structure of a radiation detector 100 according to the present invention. FIG. 1 is a conceptual view showing that a radiation detector of the present invention is coupled to a substrate 125, and FIG. 2 is a perspective view showing a structure of the radiation detector.

The substrate 125 generally means a silicon oxide substrate formed of $SiO_2$, but may be a substrate having a flexible property or various types of substrates on which the radiation detector 100 is to be positioned. Alternatively, the substrate 125 may be a wall or a ceiling, or a wall or a ceiling inside a tunnel, for fabrication of a radiation detector having a large area.

Generally, the radiation detector 100 means a device for measuring a type or an intensity of radiation, energy, or a body exposure dose. The radiation detector 100 is classified into a gas type, a liquid type and a solid type according to a material, and the solid type is sub-categorized into a scintillator type and a semiconductor type.

The radiation detector 100 according to the present invention is sorted as a scintillator type among a solid type. The radiation detector 100 includes a scintillator 110 and a light detector 120, and has a structure that the scintillator 110 and the light detector 120 are coupled to each other.

The scintillator 110 means a material that exhibits scintillation when excited by ionizing radiation. The scintillation means a phenomenon that a material is excited to generate light. The scintillator 110 performs a process of emitting light (more specifically, visible rays) as electrons positioned on a valence band are excited to a conduction band and then are transited by absorbing radiation energy.

Radiation absorbed by the scintillator 110 is a material which moves in a high energy state. The radiation includes an x-ray, an α-ray, a β-ray and a γ-ray. The γ-ray is generated from a core structure. And the α-ray is particles having a mass, and has a high energy more than several tens of electron volts (KeV).

The scintillator 110 is generally based on a crystalline compound such as $LaBr_3$, LYSO, $Gd_2SiO_5$(GSO), $Bi_4Ge_3O_{12}$(BGO), NaI, CsI, TlBr and $HgI_2$. And the scintillator 110 has a disadvantage that a fabrication cost is high because many unitary processes are required at the time of fabrication, and has disadvantages that it has a high volume and it is stable. Further, since the scintillator 110 is not easily operated in a bent or twisted state due to its inflexible characteristic, it is difficult to apply the scintillator 110 to a wearable or foldable device. Besides, the scintillator 110 has a restriction in utilization because the radiation detector 100 has a great thickness after fabrication. Further, since it is difficult to fabricate a radiation detector of a large area in a cost aspect, the radiation detector has a difficulty in being applied to a missile search, a container search, etc.

In the present invention, the scintillator 110 is formed of a two-dimensional nanomaterial except for graphene. Since the scintillator 110 formed of a two-dimensional nanomaterial has a flexibility due to a characteristic of the material, it is possible to fabricate the radiation detector 100 having a flexible characteristic by combining a two-dimensional nanomaterial with the light detector 120 having an activation layer 123. Further, the scintillator 110 can be fabricated by applying a polymer solution 10 including a two-dimensional nanomaterial to a desired substrate (e.g., a flexible substrate, a silicon oxide substrate, a wall, a ceiling, etc.) by a printing process. Accordingly, it is possible to fabricate the radiation detector 100 having a large area and a low cost by forming the light detector 120 on the scintillator 110.

The two-dimensional nanomaterial means a material having a thickness of one or two atoms, or a combination thereof. The two-dimensional nanomaterial has a two-dimensional planar structure scarcely having a thickness. The two-dimensional nanomaterial includes graphene, a graphene oxide, a reduced graphene oxide, and graphene quantum dots, and includes a chemical formula of $MX_2$. In the present invention, a two-dimensional nanomaterial means at least one of the above materials, and includes respective materials or a combination thereof.

Graphite has a structure that carbons are stacked on each other in a hexagonal comb shape. And graphene is a single carbon layer separated from graphite, and has a thin film structure that carbon atoms are unfolded in a planar form. That is, graphene, a two-dimensional material formed of carbon atoms, has a comb-shaped structure, and means a material which is very stable physically and chemically and which has a charge mobility higher than that of silicon (Si) 100 times or more.

The graphene has a thickness of one atom (about 0.35 nm), and has a high transparency and an excellent thermal and mechanical property. Further, graphene has advantages such as high charge mobility, high current density, an excellent thermal conductivity, a low heat value, a simple patterning process, flexibility and elasticity. However, graphene is not suitable to be used as a material of the scintillator 110, because it does not emit light due to no band gap even if radiation is incident thereon.

The graphene oxide, the reduced graphene oxide and the graphene quantum dots have a thin film structure that carbon atoms are unfolded in a planar form, have a similar structure to graphene, and have an advantage that they can rapidly react due to high charge mobility. Such materials can be formed to have a small size or thickness as nanomaterials, and can be formed through a printing process (a solution process), thereby enabling the radiation detector 100 of a large area to be manufactured. Further, since such materials have a flexible characteristic, it is possible to manufacture the flexible radiation detector 100 using such a characteristic. The materials have a band gap, and thus have a light emission phenomenon. When the materials absorb radiation, electron-hole pairs are bonded to each other, and energy having an amount corresponding to the band gap is emitted as light. Accordingly, the materials can constitute the scintillator 110 of the radiation detector 100.

The band gap is called an energy gap, and means an energy level between a highest energy level where electrons exist and a lowest energy level where electrons do not exist, or a difference therebetween. An energy level where no electrons exist is called a conduction band, and an energy level where electrons exist is called a valence band. Here, a difference between the two energy levels is a band gap. If a material receives a sufficient amount of energy through heat or radiation, electrons can move from a valence band to a conduction band.

The graphene oxide does not have a chemical structure specifically described, but has a structure that oxygen functional groups are bonded to each other through a covalent bond at an upper surface and an edge part of nano graphene, in an oxidized form of graphene. Graphene oxide is an oxide obtained by oxidizing graphite, and may form a film through a thin film process because a dispersed solution can be formed unlike graphite.

Figure 6:
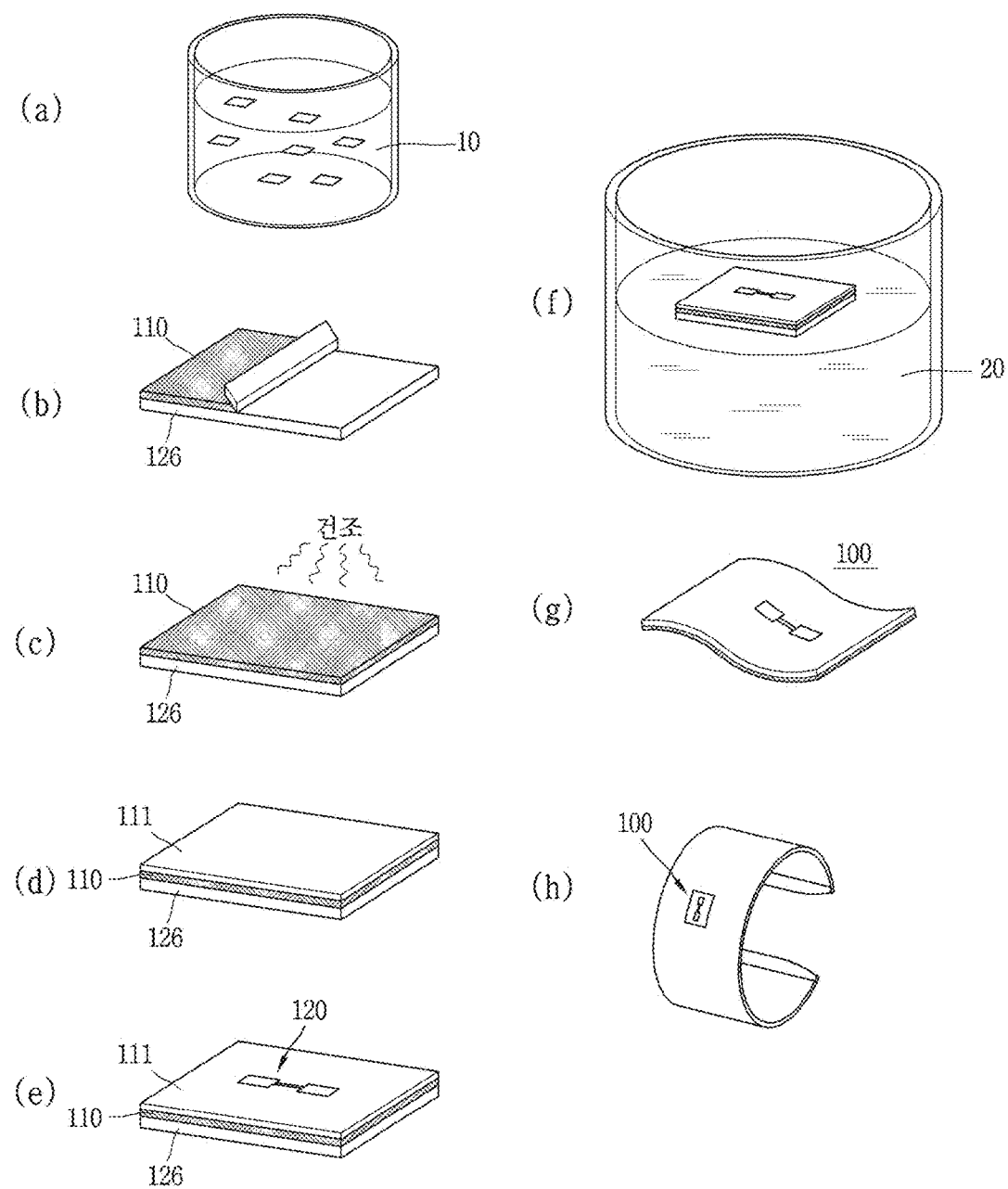
FIG. 6 is a conceptual view showing processes of manufacturing a radiation detector.

As shown in FIG. 6, the scintillator 110 may be formed by applying the polymer solution 10 including a graphene oxide to the silicon oxide substrate 125, etc., in a layered manner.

After forming a thin film of the graphene oxide by using a dispersed solution of the graphene oxide, if the graphene oxide is reduced, graphene of a thin layer type may be formed. This is called a reduced graphene oxide. The reduced graphene oxide means a reduced substance obtained by reducing a graphene oxide. The reduced graphene oxide has a similar form and property to graphene, but has a band gap, thereby being able to be used as a material of the scintillator 110. As the polymer solution 10 including a graphene oxide is applied onto the silicon oxide substrate 125, the scintillator 110 may be formed.

The graphene quantum dots mean a material obtained from a conductive material (graphene) in the form of a dot having a size less than about 10 nm, so as to be implemented in the form of a semiconductor. Electrons are kept in a space wall when a particle size is less than several tens of nanometers. In this case, a semiconductor characteristic of the conductive material may be used peculiarly. The scintillator 110 may be formed by applying the conductive material onto the silicon oxide substrate 125.

The two-dimensional nanomaterial includes a material having a chemical formula of $MX_2$. A layered compound, a transition metal dechalcogen-based compound (TMDs) has a chemical formula of $MX_2$. Here, the 'M' is one of elements which belong to groups 4~6 in a periodic table, and the 'X' is a chalcogen element which is one of sulfur (S), selenium (Se), tellurium (Te). $MX_2$ forms a covalent bond between M and X inside each layer, but has a bond between layers through van der Waals forces. The $MX_2$ has a flexibility due to a layered structure, and can serve as a material of the scintillator 110.

That is, the scintillator 110 may be formed of molybden disulphide ($MoS_2$), molybden diselenide ($MoSe_2$), tungsten disulphide ($WS_2$), tungsten diselenide ($WSe_2$), etc.

The molybden disulphide ($MoS_2$) is used in a field effect transistor, an optical transistor, a double-layer chemical sensor, a logic circuit, a memory, an amplifier, etc. The molybden disulphide ($MoS_2$) is a material having a band gap of about 1.1 eV in a bulk state, and is a material having a band gap of about 1.55 eV as it becomes thin as a single layer. The molybden disulphide ($MoS_2$) has a layered structure, and generally has a particle size of about 1~3 μm and a thickness of about 3~80 nm.

In the present invention, the scintillator 110 may be formed of a two-dimensional nanomaterial except for graphene, as a single layer. However, when the scintillator 110 has a small thickness, radiation having high energy is transmitted without being absorbed. Thus, for absorption of radiation, the scintillator 110 is preferably formed to have a large thickness as two-dimensional nanomaterials are stacked on each other a plurality of times, or is preferably mixed with another material in the form of a composite. The shape of the scintillator 110 shown in each drawing is merely exemplary, and the present invention is not limited to this.

The scintillator 110 generates light by absorbing radiation, and the light detector 120 absorbs the light (visible rays) to convert it into an electric signal. Then, an amplifier amplifies the electric signal generated from the light detector 120, and a current/voltage tester measures a radiation amount incident through the amplified signal.

Generally, the light detector 120 uses a stable semiconductor wafer including silicone (Si), and is manufactured as processes using expensive semiconductor equipment are repeated. In order to manufacture the radiation detector 100, a process of attaching the additionally formed scintillator 110 to the light detector 120 should be further performed. The light detector 120 has a comparatively large thickness of about 300~600 μm due to a characteristic of a semiconductor wafer. Further, the light detector 120 has a disadvantage that an attachment surface of the scintillator 110 has a limited shape, because the light detector 120 has a stable characteristic by being manufactured based on a wafer.

Figure 3:
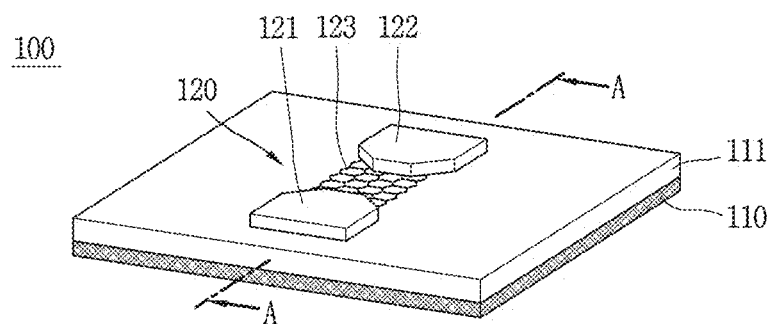
FIG. 3 is a perspective view of a radiation detector according to the present invention.

Referring to FIG. 3, the light detector 120 has a structure that a first contact electrode 121 and a second contact electrode 122 are spaced apart from each other on an insulating layer 111 of the scintillator 110, and that an activation layer 123 is connected between the first and second contact electrodes 121, 122.

The first and second contact electrodes 121, 122 may have or may not have the same configuration and shape. The first and second contact electrodes 121, 122 may have various shapes, and the present invention is not limited to the shape shown in the drawings.

The first and second contact electrodes 121, 122 are generally formed of palladium (Pd) and platinum (Pt) having an excellent conductivity. However, the present invention is not limited to this. The first and second contact electrodes 121, 122 are arranged at different positions on the insulating layer 111 of the scintillator 110.

The activation layer 123 of the light detector 120 is formed of a two-dimensional nanomaterial including graphene. As the activation layer 123 absorbs light generated from the scintillator 110, an electron moving path is formed via electron-hole pairs. The activation layer 123 is formed of a two-dimensional nanomaterial, and has a flexibility or an elasticity due to a characteristic of the two-dimensional nanomaterial. Accordingly, the light detector 120 is transformed in correspondence to a shape of an attachment surface of the scintillator 110, and then is coupled to the scintillator 110 to constitute the radiation detector 100.

If a two-dimensional nanomaterial is used as a material of the activation layer 123, the light detector 120 has a flexibility due to a characteristic of the material, and is transformable in correspondence to a shape of the scintillator 110. Accordingly, a shape of an attachment surface of the scintillator 110 is not restricted.

The two-dimensional nanomaterial means a material having a thickness of one or two atoms, or a combination thereof. And the two-dimensional nanomaterial has a two-dimensional planar structure having no thickness, which has been aforementioned.

The aforementioned two-dimensional nanomaterial used as a material of the scintillator 110 may be used as a material of the light detector 120. The activation layer 123 of the light detector 120 includes graphene, graphene oxide, reduced graphene oxide, and graphene quantum dots, and includes a chemical formula of $MX_2$.

That is, the activation layer 123 of the light detector may be formed of at least one included in the two-dimensional nanomaterial, or may be formed of respective materials or a combination thereof. With such a configuration, the light detector 120 which does not restrict a shape of the scintillator 110 may be obtained.

A graphene oxide, a reduced graphene oxide and graphene quantum dots have a similar structure to graphene which has a thin film structure that carbon atoms are unfolded in a planar form, and they generate an electric signal by forming electron-hole pairs when receiving light. The materials may constitute the activation layer 123 of the light detector 120 due to their high charge mobility and flexibility. Unlike graphite, a dispersed solution may be prepared and then a film may be formed through a thin film process, thereby forming the activation layer 123 of the light detector 120.

Figure 5:
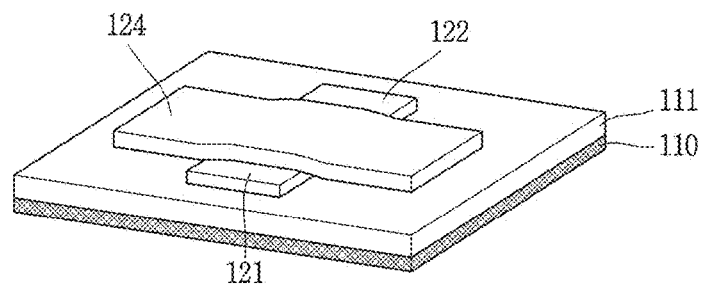
FIG. 5 is a perspective view of a radiation detector that a passivation layer is coupled to an activation layer of a light detector.

Referring to FIG. 5, the light detector 120 may further include a passivation layer 124 for preventing the activation layer 123 of the light detector 120 from being exposed to the outside.

The passivation layer 124 protects a device by preventing the device from being exposed to the outside. The passivation layer 124 contacts the protruded first and second contact electrodes 121, 122 and the silicon oxide substrate 125. And the passivation layer 124 is supported by the first and second contact electrodes 121, 122, and is adhered to the activation layer 123.

The passivation layer 124 is illustrated to have a predetermined shape, but this is merely exemplary. That is, the passivation layer 124 may have various shapes. The passivation layer 124 is not a core component of the light detector 120, and the light detector 120 having no passivation layer may be implemented. The passivation layer 124 may be formed of aluminum oxide ($Al_2O_3$), but the present invention is not limited to this.

Figure 4:
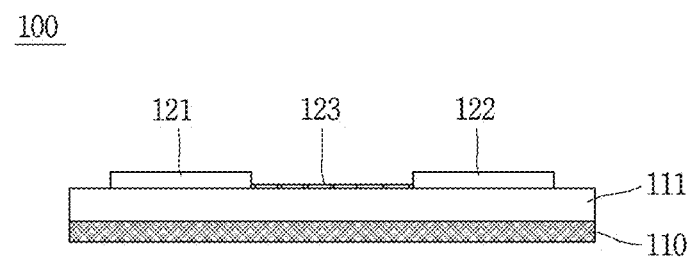
FIG. 4 is a sectional view of a radiation detector according to the present invention, which is taken along line 'A-A' indicated in FIG. 3 and which is viewed from the direction 'A'.

FIG. 4 is a sectional view of the radiation detector 100 according to the present invention, which is taken along line 'A-A' indicated in FIG. 3 and which is viewed from the direction 'A'.

Referring to FIG. 4, the radiation detector 100 has a structure that an insulating layer 111 formed of an oxide such as $SiO_2$, $Al_2O_3$ and $HfO_2$ or a nitride such as $SiN_x$ and $AlN_x$ is formed on the scintillator 110 formed of a two-dimensional nanomaterial except for graphene, with a thickness of about 30~50 nm. The first and second contact electrodes 121, 122 are protruded from the insulating layer 111, and the activation layer 123 formed of a two-dimensional nanomaterial is connected between the two first and second contact electrodes 121, 122 in a structure where the light detector 120 is positioned.

The activation layer 123 of the light detector 120 may perform its function if it is connected to the two contact electrodes 121, 122. The activation layer 123 may contact or may not contact the insulating layer 111. The activation layer 123 may be formed in plurality, and may have a different configuration. That is, the light detector 120 may have a structure that the activation layer 123 formed of two or more two-dimensional nanomaterials is connected between the contact electrodes 121, 122, on the insulating layer 111 of the scintillator 110. In the present invention, the shape of the light detector 120 shown in each drawing represents an example, and the present invention is not limited to this.

As shown in FIG. 2, the radiation detector 100 according to the present invention has a structure that the insulating layer 111 is formed on the scintillator 110, and the light detector 120 is formed on the insulating layer 111. That is, the insulating layer 111 is interposed between the scintillator 110 and the light detector 120, and prevents an electric signal directly generated from the scintillator 110 from being transferred to the light detector 120. The insulating layer 111 blocks an electric signal between the scintillator 110 and the light detector 120.

If the scintillator 110 generates light by absorbing radiation, the light detector 120 generates an electric signal by absorbing the generated light. Then, the light detector 120 measures radiation based on the electric signal. If an electric signal is directly generated from the scintillator 110, a precise radiation amount cannot be measured. Accordingly, for a precise detection of a radiation amount, the insulating layer 111 for blocking an electric signal is interposed between the scintillator 110 and the light detector 120.

The insulating layer 111 may be formed to have a thickness of about 30~50 nm. And the insulating layer 111 may be formed of an oxide such as $SiO_2$, $Al_2O_3$ and $HfO_2$, or may be formed of a nitride such as $SiN_x$ and $AlN_x$. However, the material of the insulating layer 111 is not limited to this.

So far, has been explained a structure of the radiation detector 100 including the scintillator 110 and the light detector 120. Hereinafter, will be explained a method for manufacturing the radiation detector 100.

FIG. 6 shows processes of manufacturing the radiation detector 100. The scintillator 110 includes graphene, a graphene oxide, a reduced graphene oxide, and graphene quantum dots, and includes a chemical formula of $MX_2$. Here, the 'M' is one of elements which belong to groups 4~6 in a periodic table, and the 'X' is a chalcogen element which is one of sulfur (S), selenium (Se), tellurium (Te). That is, as shown in FIG. 6(a), a composite is formed by using the polymer solution 10 including a two-dimensional nanomaterial except for graphene. The reason is because it is difficult to form the scintillator 110 with only a two-dimensional nanomaterial, on the substrate 125 or a position for measuring radiation.

As shown in FIG. 6(b), the polymer solution 10 including a two-dimensional nanomaterial is formed on a silicone oxide substrate 126. The polymer solution 10 including a two-dimensional nanomaterial can be formed through a printing process. Referring to FIG. 6(b), the polymer solution 10 including a two-dimensional nanomaterial is formed on the silicone oxide substrate 126. However, the present invention is not limited to this. That is, the polymer solution 10 may be formed at any desired position of the radiation detector 100.

The polymer solution 10 may be formed as the scintillator 110 through a printing process. The printing process is called a printed electronic device technique. Unlike the conventional method to manufacture electronic products, the printed electronic device technique applies a printing technique for manufacturing printed matters such as newspapers or magazines, to a method for manufacturing electronic components. The printing process may include an inkjet printing process, a screen printing process, etc. In the present invention, the scintillator 110 may be formed through a process of applying the polymer solution 10 including a two-dimensional nanomaterial using a brush, etc., rather than such a process.

The inkjet printing process is a technique to discharge micro ink drops (a diameter less than 30 μm) from a head for patterning on a desired position. The inkjet printing process is suitable to implement a complicated shape at a small volume. The inkjet printing process can lower fabrication costs through simple operations, and can reduce loss of a material by accumulating the material on a desired position. Further, since the inkjet printing process does not require an additional process such as etching, a characteristic of a material is not changed by a chemical influence. Further, since the inkjet printing process is a non-contact printing method, damage of a device due to contact does not occur. Further, the inkjet printing process can be applied even on a substrate having convex-concaved portions.

According to the inkjet printing process, a micro liquid drop discharged from a nozzle is attached onto a surface of a substrate, etc., and a pattern is formed as a solid component is fixed when a solvent becomes dry. The liquid drop which has dropped on the substrate spreads on the substrate two dimensionally in the form of a dot larger than the liquid drop. The liquid drop spreads by a kinetic energy generated when the liquid drop collides with the substrate, and by a wetting property of liquid.

That is, in the present invention, the scintillator 110 may be formed by spraying the polymer solution 10 including a two-dimensional nanomaterial, from a nozzle through an inkjet printing process.

The screen printing process is a process of putting an ink paste on a substrate by using a tension, and transferring the ink paste to a surface of an object to be printed by pushing the ink paste through a screen mesh by using a squeegee (paddle-shaped urethane rubber). The polymer solution 10 including a two-dimensional nanomaterial may be changed into an ink paste by such a screen printing process.

The screen printing process is implemented through 4 processes such as a rolling, a discharge, a plate separation, and a leveling.

The rolling process is used to obtain a uniform thin film by constantly stabilizing a viscosity of paste, by forward rotating the paste on a screen by a moving squeegee. The discharge process is used to push the paste to a surface of a substrate through meshes of the screen by the squeegee. Here, a discharge force depends on an angle between the squeegee and the screen, and a moving speed of the squeegee.

The plate separation process is used to separate the screen from the substrate after the paste reaches the surface of the substrate, which determines a resolution and a consecutive printing characteristic.

The paste which has reached the substrate through the screen spreads if it is in a fitted state into the screen and the substrate. Accordingly, the paste is preferably made to immediately drop off the screen. For this, the screen should be pulled by a high tension. The paste separated from the substrate after being discharged may have a possibility of a pattern change due to its fluidity, and has a mesh mark, a pin hole, etc. However, the paste loses its fluidity because its viscosity is increased by evaporation of a solvent, etc., as time passes. Finally, the paste completes a pattern. Such a process is called a leveling.

As shown in FIG. 6(c), the polymer solution 10 including a two-dimensional nanomaterial is formed on the silicon oxide substrate 126, and then undergoes a drying process. After the drying process, the polymer solution 10 including a two-dimensional nanomaterial forms the scintillator 110.

Then, as shown in FIG. 6(d), an insulating layer 111 is formed on the scintillator 110. The insulating layer 111 is formed of an oxide such as $SiO_2$, $Al_2O_3$ and $HfO_2$, or a nitride such as $SiN_x$ and $AlN_x$. However, the present invention is not limited to this.

After forming the insulating layer 111, as shown in FIG. 6(e), a light detector 120 is formed on the scintillator 110 by forming an activation layer 123, forming contact electrodes, and patterning the activation layer 123. As shown in FIG. 6(f), the silicon oxide substrate 126 is chemically removed by precipitation in an $SiO_2$ etching solution 20. As a result, as shown in FIG. 6(g), the radiation detector 100 that the light detector 120 is attached onto the scintillator 110 is completed. Then, as shown in FIG. 6(h), a transfer process is performed at a position where the radiation detector 100 is to be formed. Here, the shape shown in FIG. 6(h) is merely exemplary.

Figure 7:
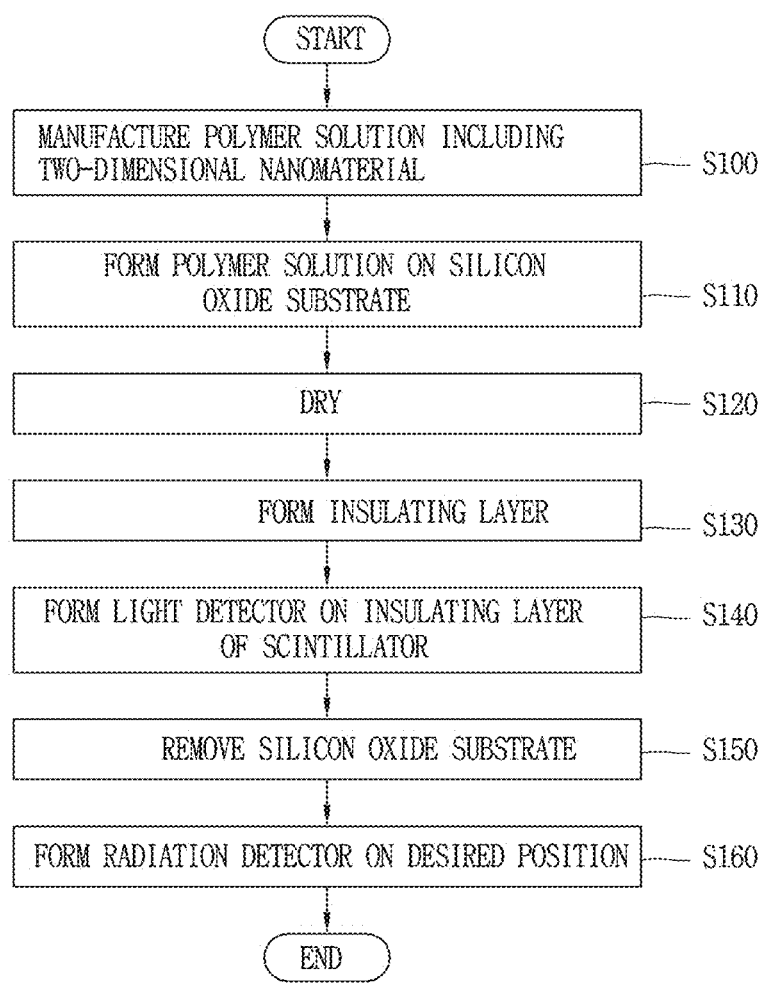
FIG. 7 is a flowchart showing processes of manufacturing a radiation detector including processes of manufacturing a scintillator.

That is, as shown in FIGS. 6 and 7, the radiation detector 100 is formed through processes of (a) forming a polymer solution 10 including a two-dimensional nanomaterial (S100), (b) forming the polymer solution 10 on a silicon oxide substrate 126 (S110), (c) drying the polymer solution 10 (S120), (d) forming an insulating layer 111 (S130), (e) forming a light detector 120 on the insulating layer 111 (S140), (f) removing the silicon oxide substrate 126 (S150), and (h) forming the radiation detector 100 at a desired position (S160).

The fabricated radiation detector 100 has flexibility because not only the scintillator 110 but also the light detector 120 has ductility, and has its thickness smaller than that of the conventional radiation detector. Since the scintillator 110 has a thickness within about 10 nm, the insulating layer 111 has a thickness of about 30~50 nm, and the light detector 120 has a thickness of about 1 nm, the radiation detector 100 formed as such components are combined with each other has a thickness of about 40~50 nm.

Figure 8:
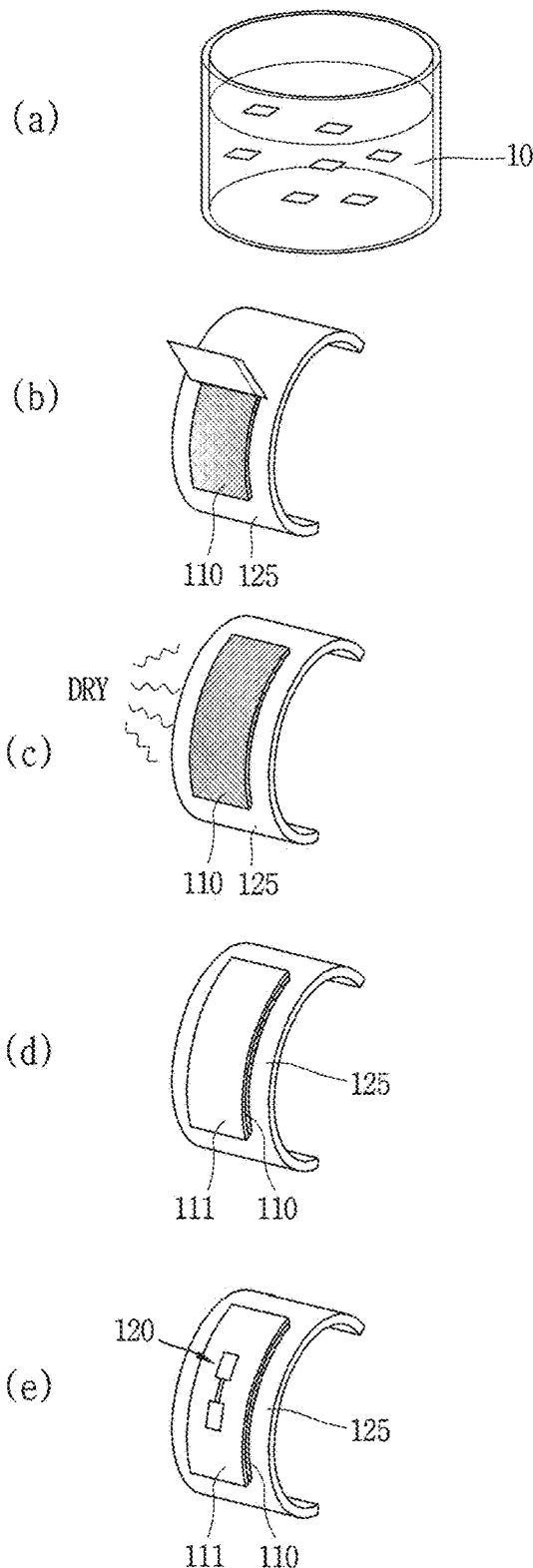
FIG. 8 is a conceptual view showing processes of directly forming a radiation detector on a desired substrate.

FIG. 8 is a conceptual view showing processes of directly forming the radiation detector 100 on a desired substrate 125 or at a desired position.

Similar to the processes shown in FIG. 6, as shown in FIG. 8(a), a composite is formed by using the polymer solution 10 including a two-dimensional nanomaterial except for graphene (S200). Then, as shown in FIG. 8(b), the polymer solution 10 is directly formed on a region where the scintillator 110 is to be formed, rather than on the silicon oxide substrate 126 (S210). In order to manufacture a desired substrate 125 or the radiation detector 100 of a large area, the polymer solution 10 may be formed on a wall or a ceiling, or in a tunnel, through a printing process. Especially, in order to manufacture the radiation detector 100 of a large area, the polymer solution 10 may be simply applied to a desired position by using a large brush, etc. Then, as shown in FIG. 8(c), the applied polymer solution 10 undergoes a drying process (S220), thereby forming the scintillator 110. Once the scintillator 110 is formed, the insulating layer 111 is formed on the scintillator 110 (S230) as shown in FIG. 8(d). The insulating layer 111 may be formed of an oxide such as $SiO_2$, $Al_2O_3$ and $HfO_2$, or a nitride such as $SiN_x$ and $AlN_x$. However, the present invention is not limited to this. After forming the insulating layer 111, as shown in FIG. 8(e), the light detector 120 is formed on the scintillator 110 by forming an activation layer 123, forming contact electrodes, and patterning the activation layer 123 (S240). As a result, the radiation detector 100 is attached to a desired region. As the scintillator 110 is directly formed at a desired position, the processes shown in FIGS. 6(f), (g) and (h) are not required.

Figure 9:
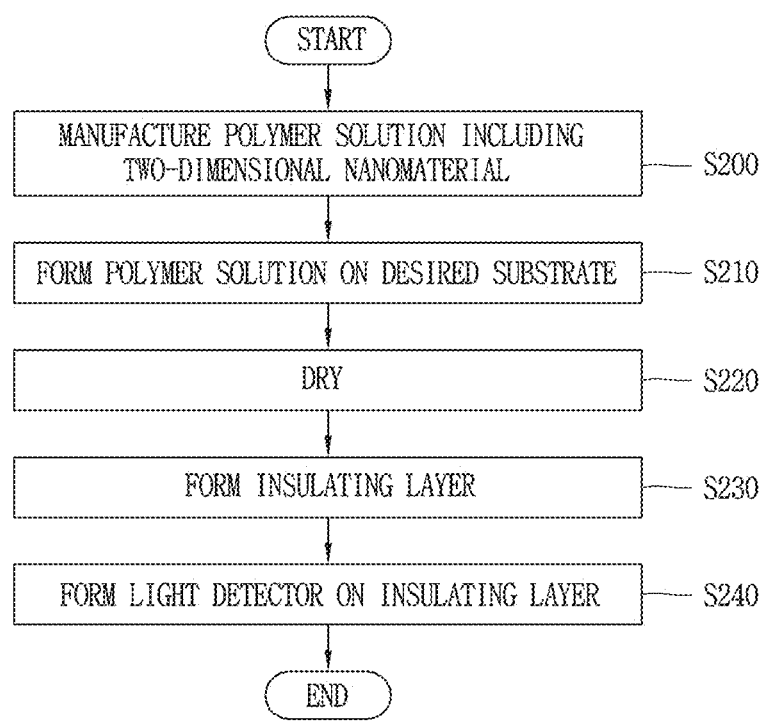
FIG. 9 is a flowchart showing processes of directly forming a radiation detector on a desired substrate.

That is, as shown in FIGS. 8 and 9, the radiation detector 100 may be formed at a desired position through the processes of (a) forming a polymer solution 10 including a two-dimensional nanomaterial (S200), (b) forming the polymer solution 10 on a desired substrate 125 (S210), (c) drying the polymer solution 10 (S220), (d) forming an insulating layer 111 (S230), and (e) forming a light detector 120 on the insulating layer 111 (S240).

Figure 10:
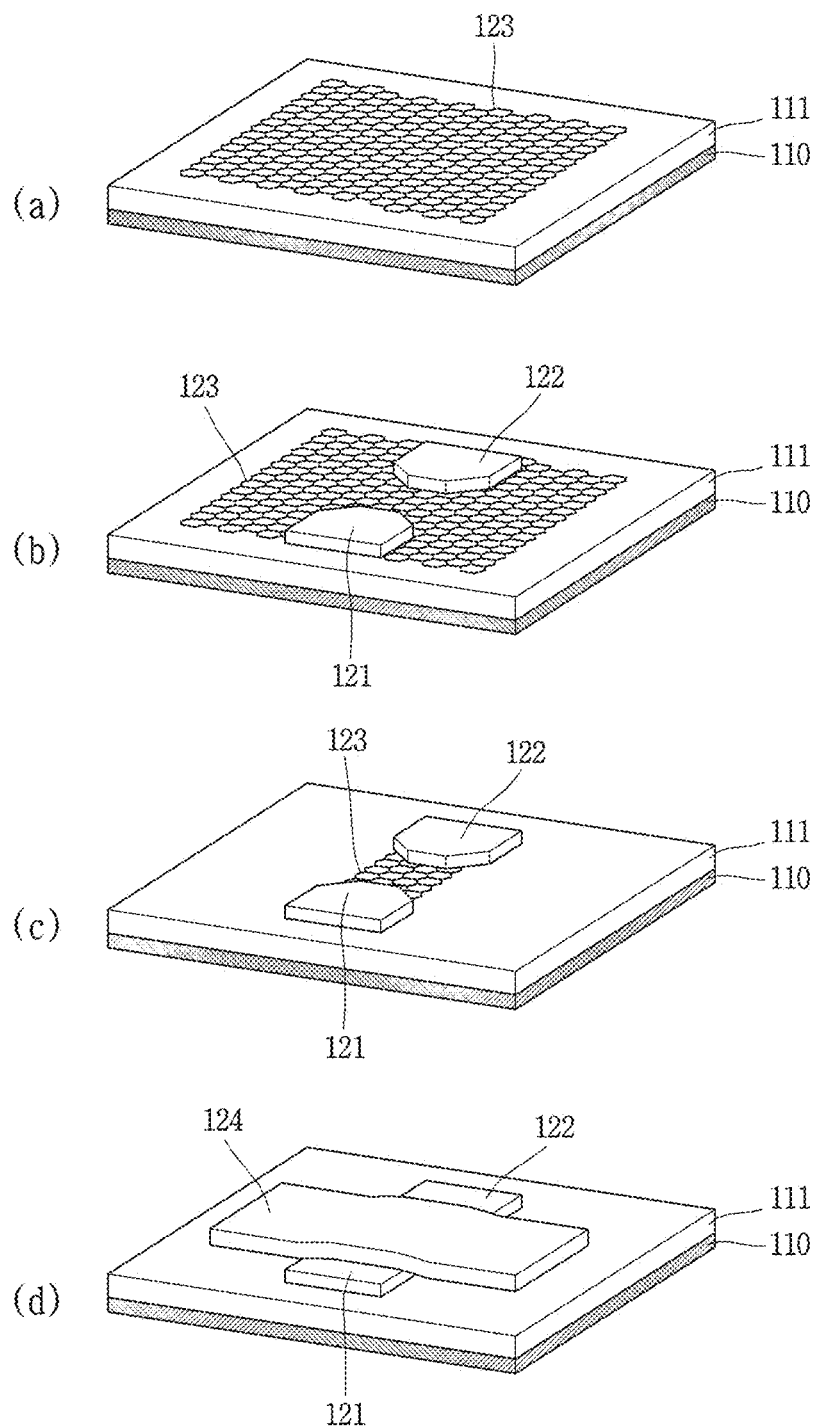
FIG. 10 is a conceptual view showing processes of forming a light detector on a scintillator.

FIG. 10 is a conceptual view showing processes of forming the light detector 120 on the scintillator 110.

If components of the light detector 120 are formed on the scintillator 110 without additionally forming the light detector 120 at the time of manufacturing the radiation detector 100, an additional attachment process of the light detector 120 is not required, and a semiconductor process is not required. This may reduce the number of fabrication processes and a fabrication time.

First of all, the scintillator 110 formed of a two-dimensional nanomaterial except for graphene is formed at a region where the radiation detector 100 is to be attached, and the insulating layer 111 is formed on the scintillator 110. Once the light detector 120 is formed on the insulating layer 111, the radiation detector 100 is completed.

As shown in FIG. 10(a), a two-dimensional nanomaterial including graphene is formed on the scintillator 110 or the insulating layer 111 of the scintillator 110 with a thickness of about a single atom, thereby constituting the activation layer 123 of the light detector 120. Once the two-dimensional nanomaterial including graphene constitutes the activation layer 123 having a thickness of a single atom, the activation layer 123 absorbs only 2~3% of light due to a high light transmittance. Accordingly, for an enhanced light absorption rate of the activation layer 123, a two-dimensional nanomaterial may be applied at least one time to form the activation layer 123.

After forming the activation layer 123 of the light detector 120 on the insulating layer 111 with a two-dimensional nanomaterial including graphene, as shown in FIG. 10(b), two contact electrodes 121, 122 are protrudingly-formed at different positions.

The contact electrodes 121, 122 serve to receive an electric signal emitted after the activation layer 123 absorbs light, and are generally formed of a material having an excellent electrical conductivity, such as copper (Cu), gold (Au), platinum (Pt) and palladium (Pd). However, the contact electrodes 121, 122 may be formed of any metallic material having an electrical conductivity.

After forming the contact electrodes 121, 122, as shown in FIG. 10(c), the activation layer is removed through a patterning process, except for the two-dimensional nanomaterial including graphene interposed between the two contact electrodes 121, 122.

The patterning process means a process of forming a desired pattern through repetitive etchings, and an operator may form the activation layer 123 in a desired shape through the pattering process. That is, the light detector 120 including the contact electrodes 121, 122 and the activation layer 123 which connects the contact electrodes with each other is positioned on the insulating layer 111 through the pattering process.

As shown in FIG. 10(d), the light detector 120 has a structure that it is supported by the contact electrodes 121, 122 while being adhered to the activation layer 123. And the light detector 120 may further include a passivation layer 124 for preventing the activation layer 123 from being exposed to the outside.

The passivation layer 124 protects a device by preventing the device from being exposed to the outside. The passivation layer 124 is formed to have a thickness of about 30 nm. In the present invention, the passivation layer 124 is formed of aluminum oxide ($Al_2O_3$), but the present invention is not limited to this.

That is, if the insulating layer 111 is formed on the scintillator 110 in order to manufacture the radiation detector 100, a two-dimensional nanomaterial including graphene is formed on the scintillator 110 (S300). Then, the contact electrodes 121, 122 are formed thereon (S310). Once the contact electrodes 121, 122 are formed, a process of patterning the activation layer 123 (S320) is performed to remove the two-dimensional nanomaterial including graphene. As a result, the radiation detector 100 is completed. Then, the passivation layer 124 for protecting the activation layer 123 may be selectively formed (S330).

Figure 11:
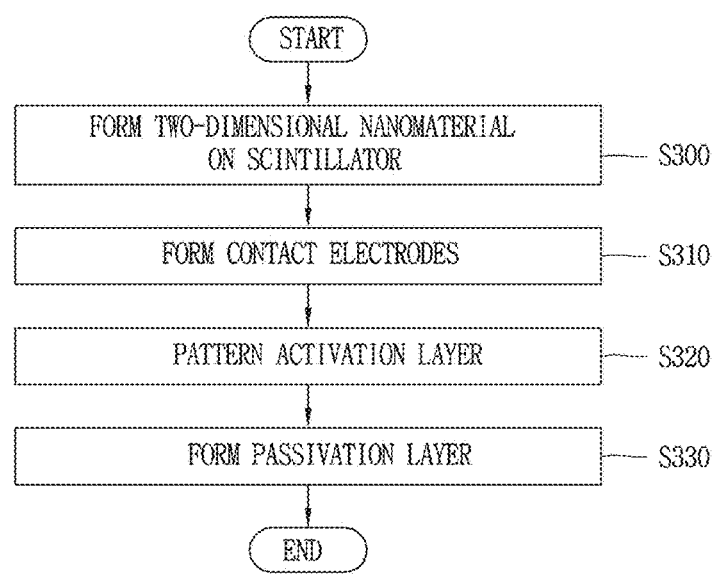
FIG. 11 is a flowchart showing processes of forming a light detector on a scintillator.

Referring to FIGS. 10 and 11, the radiation detector 100 may be manufactured through the processes of (a) forming an activation layer 123 formed of a two-dimensional nanomaterial on the scintillator 110 (S300), (b) forming two contact electrodes 121, 122 spaced apart from each other on a surface of the activation layer 123 (S310), (c) patterning the activation layer 123 such that the activation layer 123 is positioned between the two contact electrodes 121, 122 (S320), and (d) selectively forming the passivation layer 124 (S330).

Through such processes, the radiation detector 100 where the light detector 120 including the contact electrodes 121, 122 and the activation layer 123 is coupled onto the scintillator 110 may be manufactured. In case of directly forming the light detector 120 on the scintillator 110, an additional attachment process is not required. This may reduce the number of fabrication processes and a fabrication time.

Figure 12:
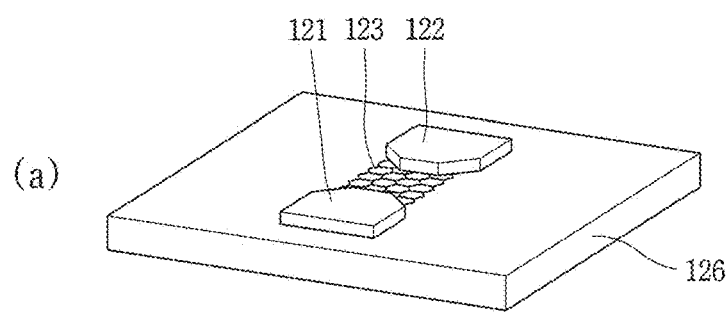
FIG. 12 is a conceptual view showing processes of forming a light detector on a scintillator using a device transfer temporary substrate.
Figure 12:
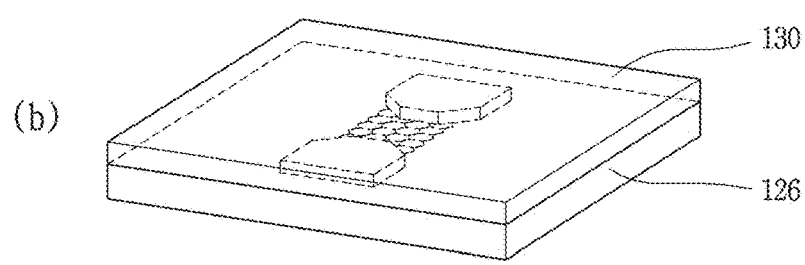
Figure 12:
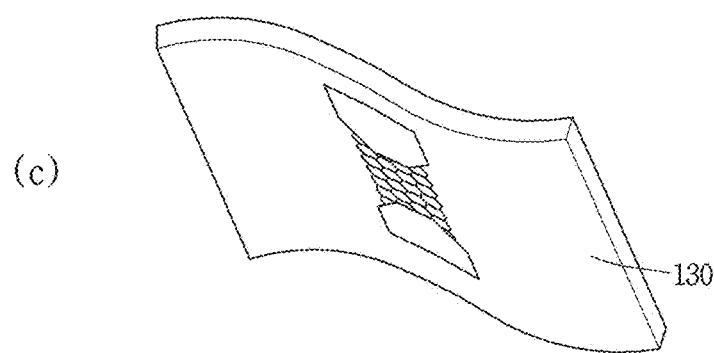
Figure 12:
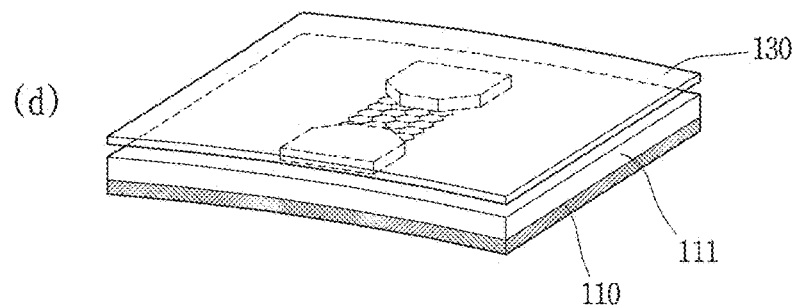

FIG. 12 is a conceptual view showing processes of forming the light detector 120 on the scintillator 110 using a device transfer temporary substrate 130.

On the silicon oxide substrate 126, the light detector 120 is formed by transferring a two-dimensional nanomaterial including graphene, by forming the contact electrodes 121, 122, and by patterning the activation layer 123. Then, a device transfer temporary substrate 130 is formed on the light detector 120.

The device transfer temporary substrate 130 has a structure to coat or cover the light detector 120 above, and is formed on the light detector 120. The device transfer temporary substrate 130 is formed as a thin plate having a thickness within about 1 μm, is configured to support or hold a device, and has a bendable property due to its flexibility. The device transfer temporary substrate 130 serves to attach a device thereto, and then to form the device at another member.

As the device transfer temporary substrate 130, polymethylmethacrylate (PMMA) is generally used. In the present invention, PMMA is also used to form the light detector 120 on the scintillator 110 by using the device transfer temporary substrate 130. The device transfer temporary substrate 130 does not influence on a reaction between devices, and may be easily removed through a simple process after a transfer process.

After forming the device transfer temporary substrate 130 on the light detector 120, the silicon oxide substrate 126 which supports the light detector 120 is chemically removed by precipitation in an $SiO_2$ etching solution 20. As a result, as shown in FIG. 12(c), the light detector 120 is attached onto the device transfer temporary substrate 130. That is, the device transfer temporary substrate 130 holds the contact electrodes 121, 122 and the activation layer 123 of the light detector 120.

If the device transfer temporary substrate 130 is formed on the scintillator 110 formed of a two-dimensional nanomaterial except for graphene through processes shown in FIG. 12(d), the radiation detector 100 is completed. Then, if the device transfer temporary substrate 130 is immersed in an acetone solution after being dehydrated, the device transfer temporary substrate 130 may be removed because it is chemically reacted in the acetone solution. Even if the device transfer temporary substrate 130 is removed, the light detector 120 including the contact electrodes 121, 122 and the activation layer 123 is coupled onto the scintillator 110 without an additional operation.

Figure 13:
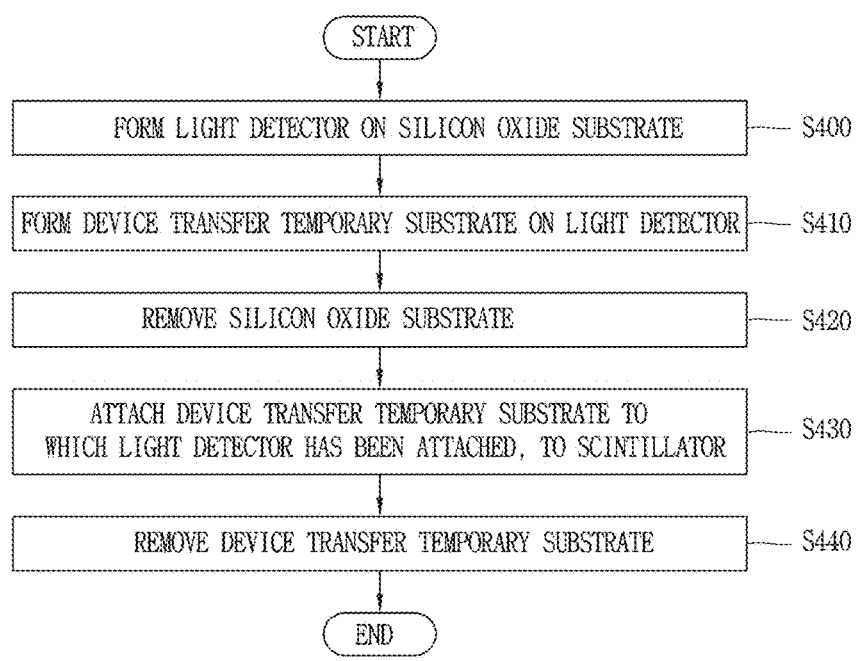
FIG. 13 is a flowchart showing processes of forming a light detector on a scintillator using a device transfer temporary substrate.

That is, as shown in FIGS. 12 and 13, the radiation detector 100 may be manufactured through processes of (a) forming the light detector 120 including a two-dimensional nanomaterial on the silicon oxide substrate 126 (S400), (b) forming the light detector 120 on the device transfer temporary substrate 130 (S410), (c) removing the silicon oxide substrate 126 (S420) (d) attaching the device transfer temporary substrate 130 to which the light detector 120 has been attached onto the scintillator 110 (S430), and (e) removing the device transfer temporary substrate 130 (S440).

Figure 14:
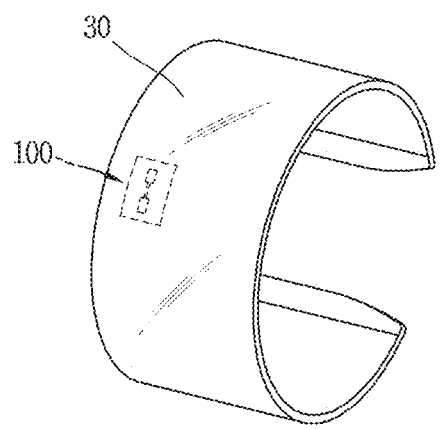
FIG. 14 is a conceptual view showing a portable device to which the present invention has been coupled.
Figure 15:
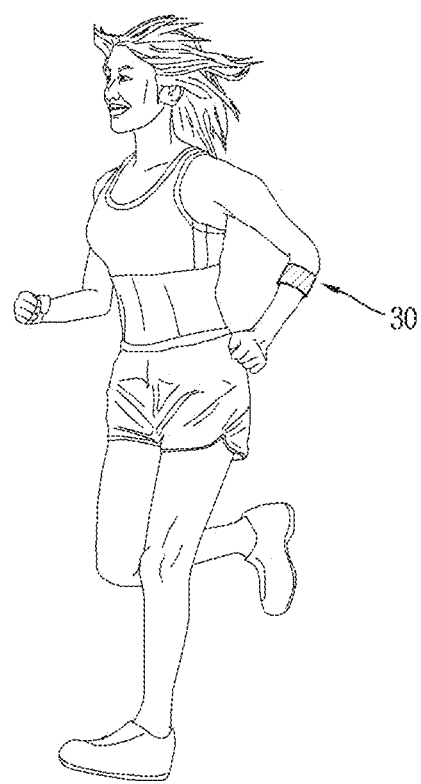
FIG. 15 is a view showing an example to actually use the portable device of FIG. 14.

FIGS. 14 and 15 show a portable device to which the radiation detector 100 that the light detector 120 is coupled onto the scintillator 110 has been coupled, and a usage example of the portable device.

If the activation layer 123 of the light detector 120 is formed of a two-dimensional nanomaterial including graphene, the light detector 120 has a bendable characteristic (ductility). Further, the scintillator 110 has ductility when it is formed of a two-dimensional nanomaterial except for graphene. Further, the radiation detector 100 to which the components are coupled has a flexibility, and does not have a restriction in an attachment surface. The radiation detector 100 may be used in a portable measuring device, a portable phone and communication equipment, a watch, etc.

If the radiation detector 100 having a flexibility can be fabricated in various shapes without a limitation in shape of an attachment surface, the radiation detector 100 does not have a specific directivity, and an equipment operator may measure radiation by installing the radiation detector 100 at a desired position. Accordingly, there is an advantage that measuring efficiency of radiation can be enhanced.

If the scintillator 110 formed of a two-dimensional nanomaterial is easily applied to a position where the radiation detector 100 is to be installed, and if the light detector 120 having a rapid charge mobility is formed on the scintillator 110 in plurality, a time resolution is large enough to detect a speed difference of light generated by radiation. And the equipment operator may check an incidence direction of radiation, and may efficiently perform a radiation imaging operation.

The equipment operator may arrange the plurality of radiation detectors 100 in a network type, and then may perform a radiation mapping operation at a rapid speed. And the equipment operator may check a partial change of a radiation amount through measurement. The radiation detector 100 is effectively utilizable to supervise an isotope production facility, to monitor a security of radioactive waste, to make a military 3D topographical map for radiation, etc. The microminiaturized flexible radiation detector 100 of the present invention can be utilized and applied to a national defense field as a dosimeter for soldiers or medical equipment, or to a microminiaturized flexible smart sensor field which performs a plurality of functions comprehensively.

Figure 16:
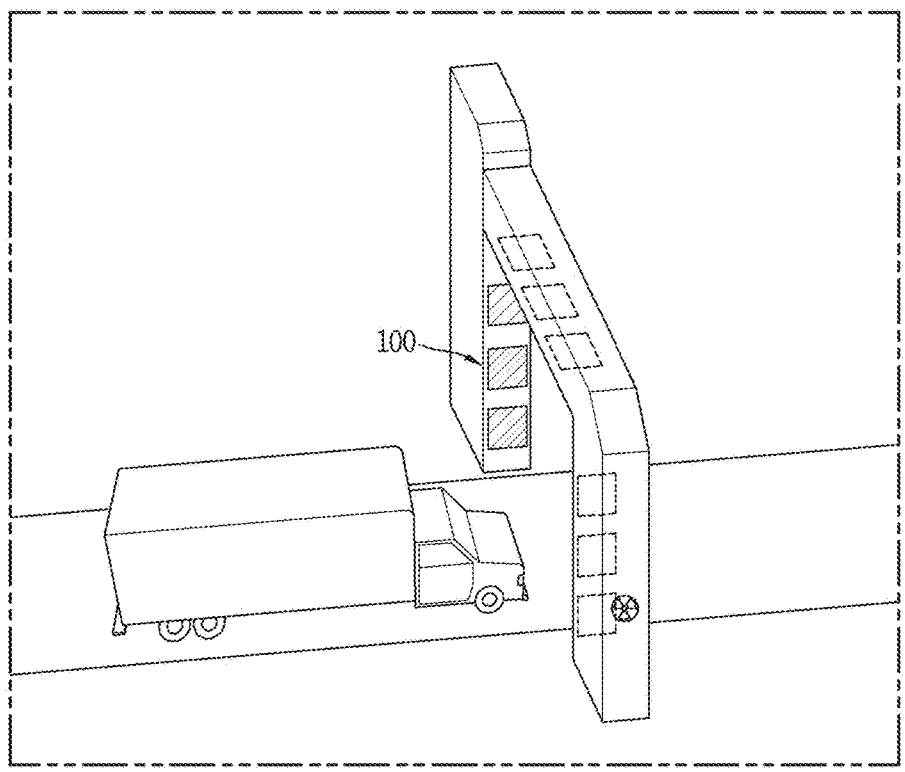
FIG. 16 is a view showing a substantial usage example of a radiation detector formed on a large area.

FIG. 16 is a view showing that the radiation detector 100 is formed on a large area to measure radiation of cargoes loaded on a vehicle. After forming the scintillator 110 by using the polymer solution 10 including a two-dimensional nanomaterial on a large area through a printing process, etc., the light detector 120 is formed. Through this process, the radiation detector 100 can be manufactured conveniently and economically. If the radiation detector 100 of a large area is used, radiation measuring efficiency may be enhanced.

Figure 17:
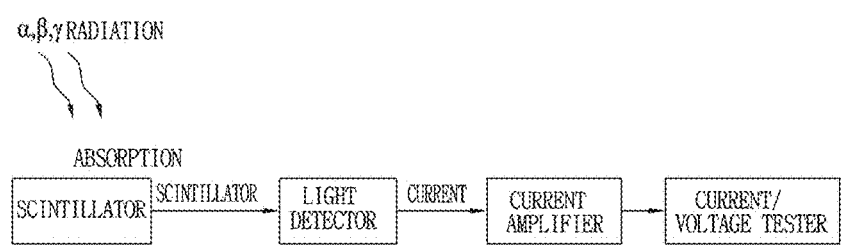
FIG. 17 is a schematic view of a radiation measuring process including the present invention.

FIG. 17 is a flowchart schematically showing a radiation measurement order including the radiation detector 100.

Once radiation such as an X-ray, an α-ray, a β-ray and an γ-ray is absorbed onto the scintillator 110, the scintillator 110 generates a visible ray. And the light detector 120 absorbs light generated from the scintillator 110, through the activation layer 123 formed of a two-dimensional nanomaterial, thereby generating an electric signal. The current generated from the light detector 120 is amplified by an amplifier, and then is transmitted to a current/voltage tester. Then, the current/voltage tester measures the received current or voltage, thereby detecting radiation and measuring a radiation amount.

The aforementioned radiation detector and the method are not limited to the aforementioned configuration and method. The embodiments may be selectively combined with each other partially or wholly for various modifications.

INDUSTRIAL APPLICABILITY

The present invention may be used in a field of a radiation detector for detecting radiation.

The invention claimed is:

1. A radiation detector, comprising:
   a scintillator for absorbing radiation to generate light; and
   a light detector formed in the scintillator,
   wherein the scintillator is formed of a two-dimensional nanomaterial for providing ductility.

2. The radiation detector of claim 1, wherein the scintillator is formed by laminating the two-dimensional nanomaterial which is at least one of a graphene oxide, a reduced graphene oxide, and graphene quantum dots.

3. The radiation detector of claim 1, wherein the two-dimensional nanomaterial has a chemical formula of MX2,
   wherein the M is one of Mo and W, and
   wherein the X is one of S, Se and Te.

4. The radiation detector of claim 1, wherein the light detector includes:
   a first contact electrode and a second contact electrode disposed on positions spaced apart from each other; and
   an activation layer for connecting the first contact electrode and the second contact electrode with each other, and for forming an electron-hole pair by absorbing light,
   wherein the activation layer is formed of a two-dimensional nanomaterial for providing ductility, so as to be coupled to the scintillator in a corresponding shape.

5. The radiation detector of claim 4, wherein the two-dimensional nanomaterial includes at least one of graphene, a graphene oxide, a reduced graphene oxide, and graphene quantum dots.

6. The radiation detector of claim 4, wherein the two-dimensional nanomaterial has a chemical formula of MX2,
   wherein the M is one of Mo and W, and
   wherein the X is one of S, Se and Te.

7. The radiation detector of claim 4, wherein the light detector includes a passivation layer adhered to the activation layer, supported by the contact electrodes, and configured to restrict exposure of the activation layer to outside.

8. The radiation detector of one of claim 1, further comprising an insulating layer interposed between the scintillator and the light detector, and configured to prevent an electric signal between the scintillator and the light detector.

9. A method for manufacturing a radiation detector, the method comprising:
   manufacturing a scintillator; and
   forming a light detector on the scintillator,
   wherein the manufacturing a scintillator includes:
   manufacturing a polymer solution including a two-dimensional nanomaterial except for graphene;
   applying the polymer solution onto a substrate through a printing process;
   forming the scintillator by removing moisture of the polymer solution; and
   forming an insulating layer on the scintillator.

10. The method of claim 9, wherein the forming a light detector on the scintillator includes:
    forming a two-dimensional nanomaterial on the scintillator as a material of an activation layer;
    forming contact electrodes on a surface of the activation layer; and
    interposing the activation layer between the contact electrodes by patterning the activation layer.

11. A method for manufacturing a radiation detector, the method comprising:
    forming a scintillator by using a two-dimensional nanomaterial except for graphene;
    forming a light detector including the two-dimensional nanomaterial on a silicon oxide substrate;
    forming a device transfer temporary substrate on the light detector, and immersing the silicon oxide substrate in an SiO2 etching solution for removal; and
    attaching the device transfer temporary substrate which supports the light detector, onto a surface of the scintillator.

12. The method of claim 11, wherein the forming a light detector on a silicon oxide substrate includes:
    forming an activation layer by transferring a two-dimensional nanomaterial onto a silicon oxide substrate;
    forming two contact electrodes spaced apart from each other on a surface of the activation layer; and
    interposing the activation layer between the contact electrodes by patterning the activation layer.

13. The method of claim 11, further comprising:
    dehydrating the device transfer temporary substrate to remove the device transfer temporary substrate attached onto the surface of the scintillator; and
    immersing the device transfer temporary substrate in an acetone solution for a chemical reaction.

* * * * *